United States Patent
Kwon et al.

(10) Patent No.: US 12,495,249 B2
(45) Date of Patent: Dec. 9, 2025

(54) VEHICLE AND METHOD OF CONTROLLING THE SAME

(71) Applicants: Hyundai Motor Company, Seoul (KR); Kia Corporation, Seoul (KR)

(72) Inventors: Ohyun Kwon, Whasung-Si (KR); Jaekyu Yu, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 182 days.

(21) Appl. No.: 18/244,824

(22) Filed: Sep. 11, 2023

(65) Prior Publication Data
US 2024/0129668 A1    Apr. 18, 2024

(30) Foreign Application Priority Data

Oct. 12, 2022 (KR) .................. 10-2022-0130730

(51) Int. Cl.
*H04S 7/00*       (2006.01)
*A61B 5/00*       (2006.01)
*B60R 21/015*     (2006.01)
*H04R 3/12*       (2006.01)

(52) U.S. Cl.
CPC .......... *H04R 3/12* (2013.01); *A61B 5/4809* (2013.01); *B60R 21/01512* (2014.10); *H04S 7/303* (2013.01); *H04R 2499/13* (2013.01)

(58) Field of Classification Search
CPC .... H04R 3/12; H04R 2499/13; A61B 5/4809; A61M 21/02; H04S 7/303
USPC ............................................. 381/86
See application file for complete search history.

(56) References Cited

U.S. PATENT DOCUMENTS

| | | | | |
|---|---|---|---|---|
| 8,031,880 | B2* | 10/2011 | Holmi | H04S 7/307 381/103 |
| 9,319,019 | B2* | 4/2016 | Selig | G06F 3/165 |
| 10,843,624 | B1* | 11/2020 | Yamamoto | B60Q 9/00 |
| 11,376,991 | B2* | 7/2022 | Oommen | B60N 2/0028 |
| 11,551,657 | B2* | 1/2023 | Starobin | H04L 12/4625 |
| 12,033,661 | B2* | 7/2024 | Nimmagadda | G06F 40/166 |
| 2021/0325200 | A1* | 10/2021 | Stafford | H04W 4/021 |
| 2022/0016386 | A1* | 1/2022 | Van Den Ende | G06F 3/015 |
| 2024/0408345 | A1* | 12/2024 | Kim | A61B 5/4812 |

* cited by examiner

*Primary Examiner* — Disler Paul
(74) *Attorney, Agent, or Firm* — Morgan Lewis & Bockius LLP

(57) ABSTRACT

A vehicle includes an audio device including a radio tuner configured for receiving radio frequency signals, a radar configured for detecting radar data of a rear seat passenger, and a controller electrically connected to the radar, wherein the controller is configured to determine, in response that a radio broadcast is being played in the audio device, whether the rear seat passenger is sleeping based on the radar data detected by the radar, switch, if the rear seat passenger is sleeping, a radio mode from a normal playback mode to a sleep assistance mode, and change, in the sleep assistance mode, at least one of radio frequency and radio sound quality through the radio tuner.

20 Claims, 12 Drawing Sheets

FIG. 7
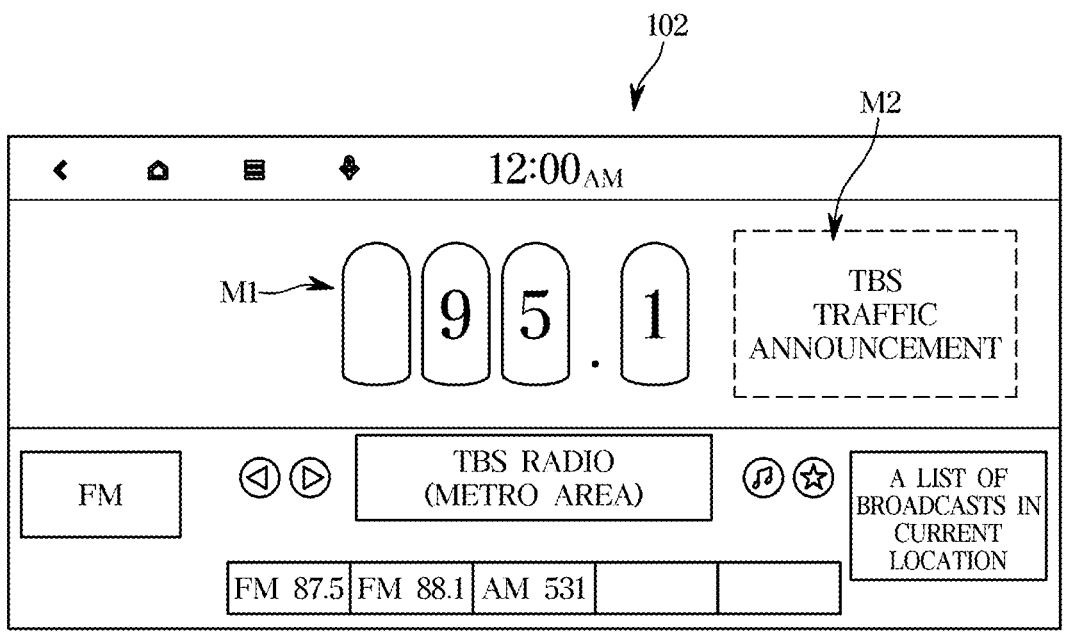
(a)
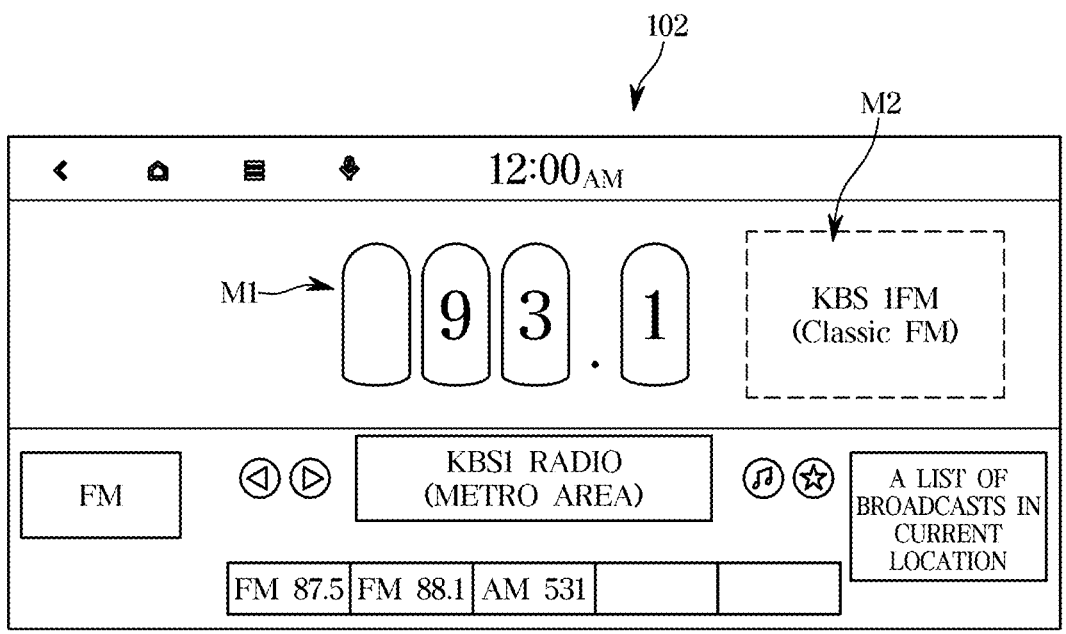
(b)

VEHICLE AND METHOD OF CONTROLLING THE SAME

CROSS-REFERENCE TO RELATED APPLICATION(S)

The present application claims priority to Korean Patent Application No. 10-2022-0130730, filed on Oct. 12, 2022, the entire contents of which is incorporated herein for all purposes by this reference.

BACKGROUND OF THE PRESENT DISCLOSURE

Field of the Present Disclosure

The present disclosure relates to a vehicle capable of assisting a rear seat passenger to sleep, and a method of controlling the same.

Description of Related Art

Generally, vehicles enable to have not only a driving function, but also perform additional functions for user convenience, such as audio, video, navigation, air conditioning, broadcasting, seat heating, communicating with external terminals, and the like.

In the case of performing at least one of an audio function, a video function, and a broadcasting function, a vehicle receives a broadcasting signal of any one of traffic broadcasting, news broadcasting, television (TV) broadcasting, and radio broadcasting transmitted from broadcasting stations, and outputs the received broadcasting signal using at least one of an audio device and a video device.

Conventionally, even if a rear seat passenger listening to a radio broadcast falls asleep, the radio broadcast is output regardless of whether the rear seat passenger is asleep, disturbing the sleep of the rear seat passenger.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for assisting a rear seat passenger to sleep by adjusting a radio mode when the rear seat passenger listening to a radio broadcast falls asleep, and a method of controlling the same.

Additional aspects of the present disclosure are set forth in part in the description which follows, and in part, should be understood from the description, or may be learned by practice of the present disclosure.

In accordance with an aspect of the present disclosure, a vehicle includes an audio device having a radio tuner configured for receiving radio frequency signals, a radar configured for detecting radar data of a rear seat passenger, and a controller electrically connected to the radar, wherein the controller is configured to determine, in response that a radio broadcast is being played in the audio device, whether the rear seat passenger is sleeping based on the radar data detected by the radar, switch, if the rear seat passenger is sleeping, a radio mode from a normal playback mode to a sleep assistance mode, and change, in the sleep assistance mode, at least one of radio frequency and radio sound quality through the radio tuner.

The radar data may include biometric change characteristics including at least one of heart rate, respiration rate, and movement of the rear seat passenger, and the controller is further configured to generate a biometric change indicator indicating the biometric change characteristics of the radar data, compare the biometric change indicator with a preset sleep pattern indicator, and conclude that the rear seat passenger is sleeping in response to the comparison result matching a preset value or more than the preset value.

The radar may be any one of an impulse-radio ultra wideband (IR-UWB) sensor, a frequency-modulated continuous-wave (FMCW) radar, and a Doppler radar.

The controller may be configured to control, in the sleep assistance mode, at least one of a frequency and a tuning parameter of the radio tuner.

The controller may obtain, in the sleep assistance mode, a radio frequency of a radio broadcast being played, and if the obtained radio frequency does not match a pre-stored radio frequency, change a current radio frequency to the pre-stored radio frequency.

The controller may obtain, in the sleep assistance mode, a radio frequency of a radio broadcast being played, determine whether the radio frequency needs to be changed based on the obtained radio frequency, and upon concluding that the radio frequency needs to be changed, change a current radio frequency to a radio frequency of a radio broadcast conducive to sleep.

The radio frequency of the radio broadcast conducive to sleep may be any one of: a radio frequency searched according to preset conditions from a schedule for the radio broadcast, a radio frequency stored by a user, or a radio frequency recommended according to big data analysis.

The vehicle may include a radio sound quality mode including an original sound emphasis mode, an original sound/noise balance mode, and a noise minimization mode, to change radio sound quality, and the controller changes, in the sleep assistance mode, the radio sound quality mode to the noise minimization mode The controller may obtain, in the sleep assistance mode, a currently set radio sound quality mode, and if the obtained radio sound quality mode does not match the noise minimization mode, change the currently set radio sound quality mode to the noise minimization mode.

The controller may obtain, in the sleep assistance mode, a currently set radio sound quality mode and an electric field strength of the radio tuner, and change the currently set radio sound quality mode to the noise minimization mode based on the obtained radio sound quality mode and the electric field strength of the radio tuner.

The noise minimization mode may include a soft-mute mode, a high-cut mode, and a stereo blend mode of which tuning parameters of the radio tuner are set differently to minimize noise.

The controller may change, in the sleep assistance mode, the noise minimization mode to any one of the soft-mute mode, the high-cut mode, and the stereo blend mode based on an electric field strength of the radio tuner.

The tuning parameters may include at least one of electric field strength, ultrasonic noise, and gain of the radio tuner.

The controller may apply, in the sleep assistance mode, the original sound emphasis mode to a first row seat speaker and any one of the soft-mute mode, the high-cut mode, and the stereo blend mode to a rear row seat speaker in which the rear seat passengers are sleeping.

The radio tuner may include at least one first radio tuner provided to correspond to the first row seat speaker and at least one second radio tuner provided to correspond to the rear row seat speaker, and The controller may change, in the sleep assistance mode, a tuning parameter of the first radio tuner to a value corresponding to the original sound emphasis mode and a tuning parameter of the second radio tuner to a value corresponding to any one of the soft-mute mode, the high-cut mode, and the stereo blend mode.

In accordance with another aspect of the present disclosure, a method of controlling a vehicle including a radio turner for receiving radio frequency signals is provided. The method includes detecting, by a controller, when a radio broadcast is being played, radar data of a rear seat passenger through a radar; determining, by the controller, based on the detected radar data, whether the rear seat passenger is sleeping; switching, by the controller, if the rear seat passenger is sleeping, a radio mode from a normal playback mode to a sleep assistance mode; and changing, by the controller, at least one of radio frequency and radio sound quality through the radio tuner in the sleep assistance mode.

The radar data may include biometric change characteristics including at least one of heart rate, respiration rate, and movement of the rear seat passenger, and the determining whether the rear seat passenger is sleeping may further include generating a biometric change indicator indicating the biometric change characteristics of the detected radar data, comparing the biometric change indicator with a preset sleep pattern indicator, and determining that the rear seat passenger is sleeping in response to the comparison result matching a preset value or more than the preset value.

The changing of at least one of the radio frequency and the radio sound quality may further include, in the sleep assistance mode, obtaining a radio frequency of a radio broadcast being played, and changing, if the obtained radio frequency does not match a pre-stored radio frequency, a current radio frequency to the pre-stored radio frequency.

The vehicle may include a radio sound quality mode including an original sound emphasis mode, an original sound/noise balance mode, and a noise minimization mode, to change radio sound quality, and the changing of at least one of the radio frequency and the radio quality may further include changing the radio sound quality mode to the noise minimization mode.

The noise minimization mode may include a soft-mute mode, a high-cut mode, and a stereo blend mode of which tuning parameters of the radio tuner are set differently to minimize noise, and the changing of at least one of the radio frequency and the radio sound quality may further include changing the noise minimization mode to any one of the soft-mute mode, the high-cut mode, and the stereo blend mode based on an electric field strength of the radio tuner.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 7A and FIG. 7B are views exemplarily illustrating changing a radio frequency in a sleep assistance mode of a vehicle according to an exemplary embodiment of the present disclosure;

Figure 1:
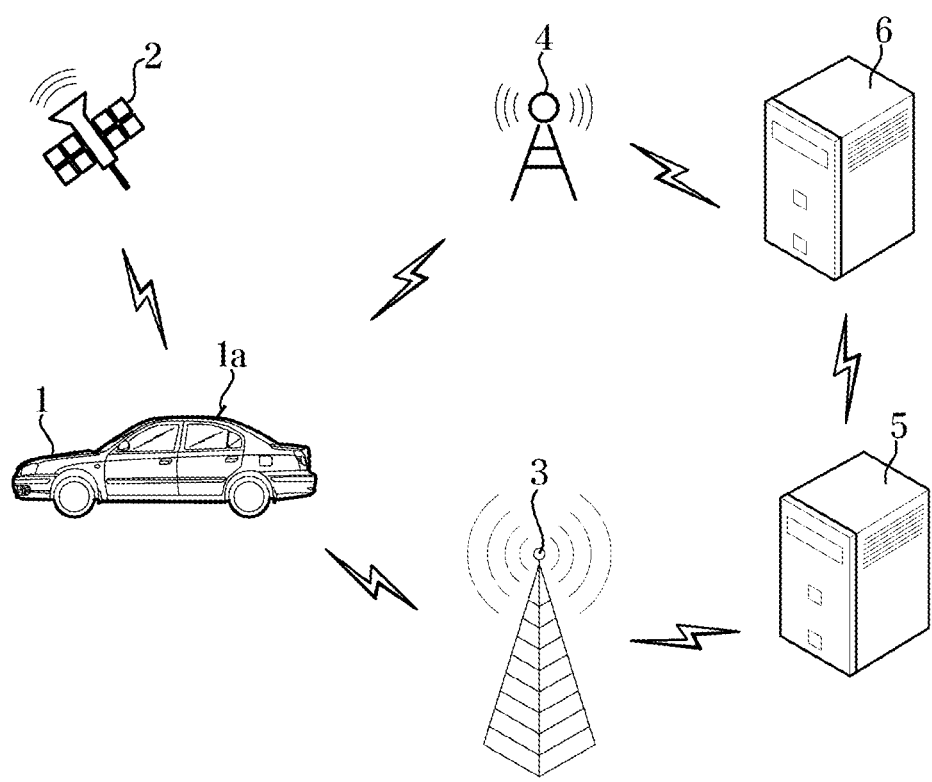
FIG. 1 is a view exemplarily illustrating a vehicle communication system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference is made below in detail to the exemplary embodiments of the present disclosure, examples of which are illustrated in the accompanying drawings, wherein like reference numerals refer to like elements throughout. The present specification does not describe all elements of the disclosed exemplary embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it includes a clearly different meaning in the context.

The reference numerals used in operations are used for descriptive convenience and are not intended to describe the order of operations and the operations may be performed in a different order unless otherwise stated.

When a component, device, element, or the like of the present disclosure is described as having a purpose or performing an operation, function, or the like, the component, device, or element should be considered herein as being "configured to" meet that purpose or to perform that operation or function.

Hereinafter, various embodiments of the present disclosure are described in detail with reference to the accompanying drawings.

FIG. 1 is a view exemplarily illustrating a vehicle communication according to an exemplary embodiment of the present disclosure.

Referring to FIG. 1, a vehicle 1 may communicate with a satellite 2, a first infrastructure 3, and a second infrastructure 4.

The vehicle 1 may perform direct or indirect communication with a first server 5 and a second server 6.

When communicating with the satellite 2, the vehicle 1 may receive a signal from the satellite 2 and recognize a current location of the vehicle based on the received signal. In the instant case, the number of satellites 2 communicating with the vehicle 1 may be one or two or more.

When recognizing the current location, the vehicle 1 may recognize the current location of the vehicle using a global positioning system (GPS), a global navigation satellite system (GNSS), or a global navigation satellite system (GLONASS).

For example, when recognizing the current location thereof, the vehicle 1 may obtain distance and time information corresponding to signals of a plurality of Global Positioning System (GPS) satellites and recognize the current location of the vehicle based on the obtained distance and time information.

As an exemplary embodiment of the present disclosure, the vehicle 1 may receive signals transmitted from a GNSS satellite and recognize the current location of the vehicle through a distance to the GNSS satellite.

When communicating with the first infrastructure 3, the vehicle 1 may emit a signal for information to be transmitted as electromagnetic waves through an antenna 1a. In other words, the antenna 1a of the vehicle may emit electromagnetic waves corresponding to electrical signals transmitted from a controller 110 (see FIG. 2) provided in the vehicle 1.

The antenna 1a of the vehicle 1 demodulates the electromagnetic waves received from the first infrastructure 3 to convert the received electromagnetic waves into electrical signals, and then transmits the converted electrical signals to the controller 110. At the instant time, the vehicle 1 may obtain control signals corresponding to the converted electrical signals and control an operation of the vehicle 1 based on the obtained control signals.

The antenna 1a of the vehicle 1 may receive the electromagnetic wave signals transmitted from the second infrastructure 4. The vehicle 1 may convert the received electromagnetic wave signals into electrical signals, and output the converted electrical signals.

The antenna 1a of the vehicle 1 may be an antenna according to a second generation (2G) communication method, such as Time Division Multiple Access (TDMA) and Code Division Multiple Access (CDMA), a third generation (3G) communication methods, such as wide code division multiple access (WCDMA), CDMA 2000, Wireless Broadband (WiBro), and Worldwide Interoperability for Microwave Access (WiMAX), and the like, a fourth generation (4G) communication method, such as Long Term Evolution (LTE) and wireless broadband evolution, or a fifth generation (5G) communication method.

The vehicle 1 may transmit frequency and broadcasting station information of a radio broadcast being output from the vehicle 1 to the first server 5 through connected car service (CCS) services, transmit location information of the vehicle 1 to the first server 5, and also transmit current time information and identification information of the vehicle 1 to the first server 5.

The satellite 2 transmits satellite signals to the vehicle 1 so that the vehicle 1 may recognize a current location of the vehicle.

The satellite 2 may be any one of a GNSS satellite, a GLONASS satellite, and a GPS satellite. The satellites 1 may be one or two or more.

The first infrastructure 3 may be provided on a road, and may be communicate with the first server 5 and transmit information transmitted from the first server 5 to the vehicle 1 and transmit information transmitted from the vehicle 1 to the first server 5. The information transmitted from the first server 5 may be broadcasting information.

The first infrastructure 3 may receive the electromagnetic waves emitted from the antenna 1*a* of the vehicle 1, transmit electrical signals corresponding to the received electromagnetic waves to the first server 5, and convert the electrical signals transmitted from the first server 5 into electromagnetic waves to emit the converted electromagnetic waves.

The second infrastructure 4 may be provided on a road, and may be communicate with the second server 6 and receive electromagnetic waves transmitted from the second server 6 and transmit the received electromagnetic waves. The electromagnetic waves transmitted from the second server 6 may be broadcast signals for radio broadcasting.

The second infrastructure 4 may be an infrastructure for receiving and transmitting broadcast signals.

The second infrastructure 4 may receive broadcast signals for radio broadcasts transmitted from a plurality of broadcasting stations and transmit the received broadcast signals.

The second infrastructure 4 is a device that receives broadcast signals received through a broadcasting station, a broadcast satellite, a cable, Internet, and the like and transmits the received broadcast signals, and may be a device that receives an external broadcast signal and transmits the received external broadcast signal again.

The first server 5 receives broadcasting information on the radio broadcast received from the second server 6, stores the received broadcasting information, and transmits the stored broadcasting information to the vehicle 1 through the first infrastructure 3.

Furthermore, the first server 5 stores broadcasting information provided from a plurality of second servers 6 and transmits the stored broadcasting information to the vehicle 1 through the first infrastructure 3.

The broadcasting information may include channel information, frequency information, broadcasting station information, program information, and broadcasting time information, and the program information may include a program title and host information.

Furthermore, the broadcasting information may be displayed as at least one of text information and image information.

The image information may include a face image of a host and a symbol image corresponding to a program title.

The first server 5 may receive a schedule of radio broadcasts from the second server 6 of each broadcasting station, and may download schedules known from web pages of each broadcasting station.

The first server 5 may transmit broadcasting information of a radio broadcast to the vehicle 1 in response to a request of the vehicle 1.

The second server 6 is a server provided in a broadcasting station, and may store broadcasting information on radio broadcasting of the broadcasting station and transmit the stored broadcasting information to the first server 5. The second server 6 may be provided in each of broadcasting stations. In other words, the number of second servers 6 may be plural.

The second server 6 may output broadcasting signals for radio broadcasting. In other words, the second server 6 may output broadcast signals of ongoing radio broadcasts as electromagnetic waves.

Figure 2:
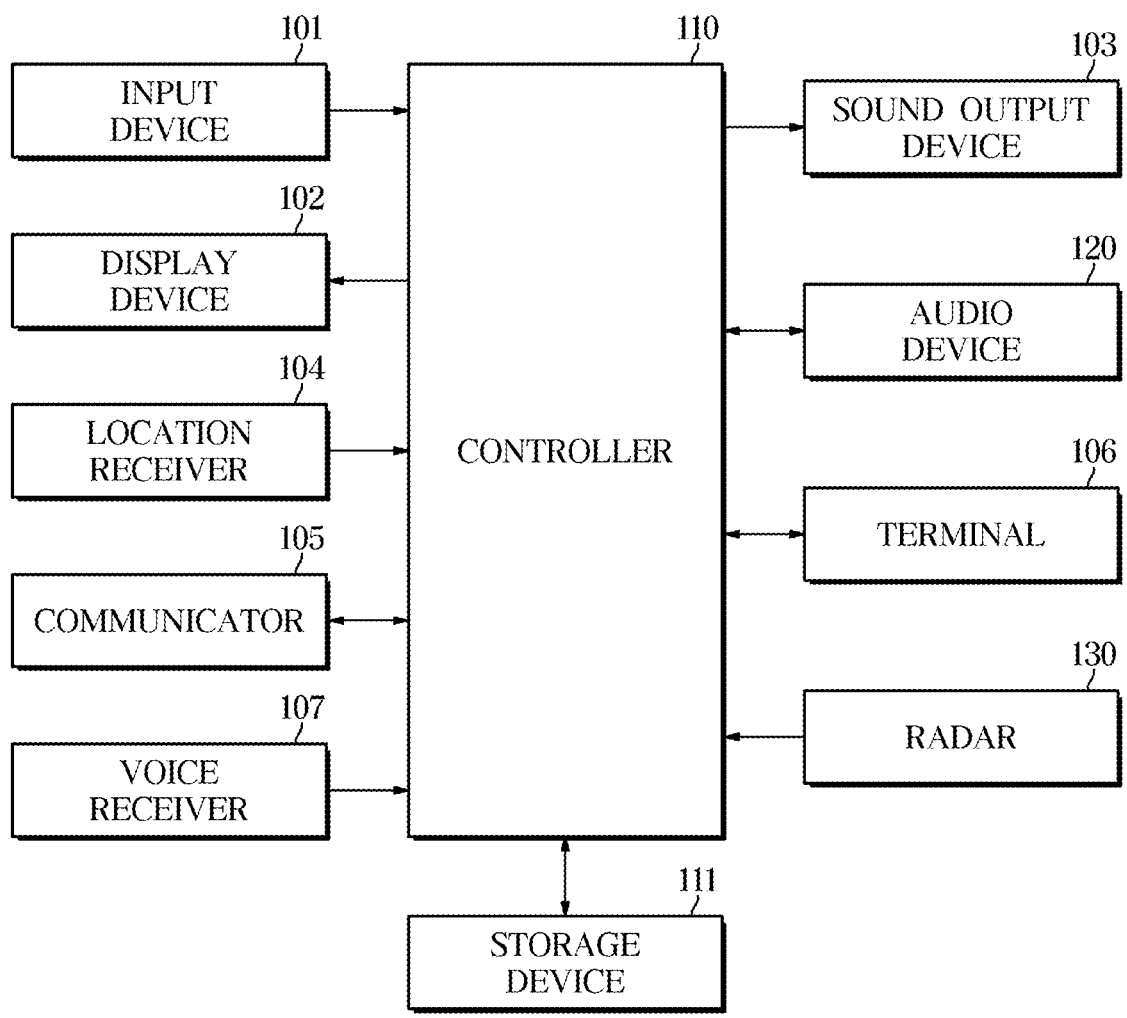
FIG. 2 is a view exemplarily illustrating a control configuration of vehicle according to an exemplary embodiment of the present disclosure.
Figure 3:
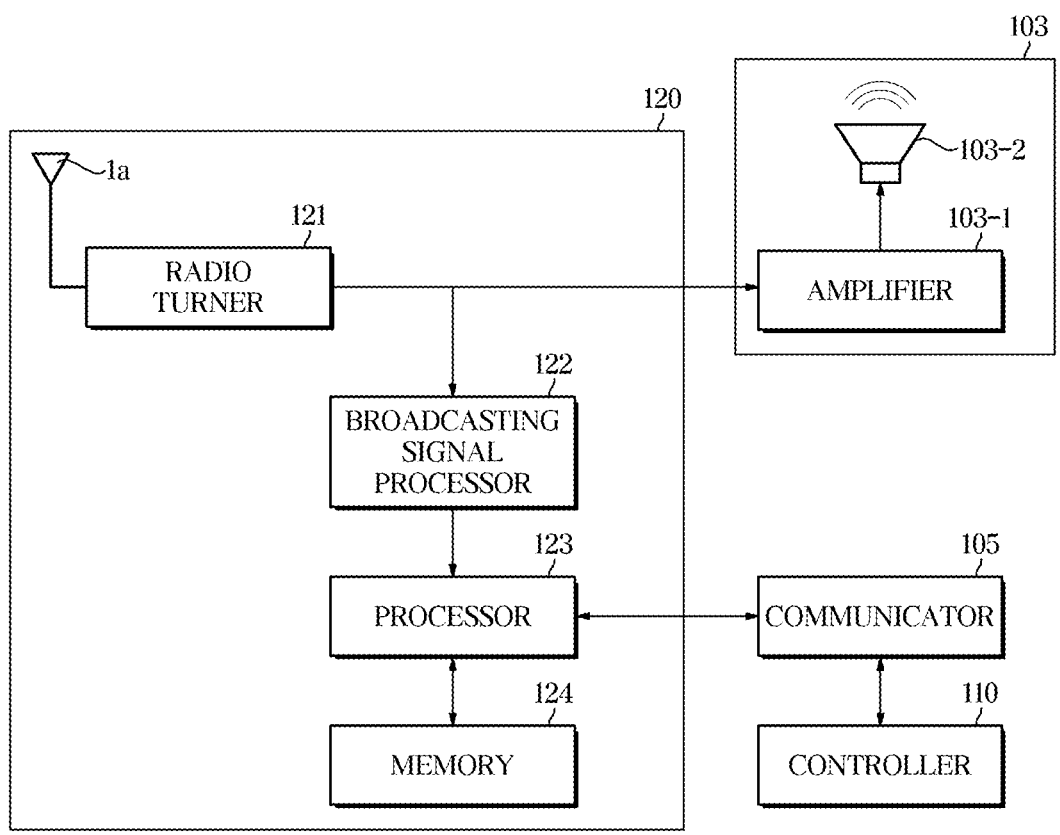
FIG. 3 is a view exemplarily illustrating a detailed configuration of an audio device provided in a vehicle according to an exemplary embodiment of the present disclosure.

FIG. 2 is a view exemplarily illustrating the control configuration of a vehicle according to an exemplary embodiment of the present disclosure, and FIG. 3 is a view exemplarily illustrating the detailed configuration of an audio device provided in a vehicle according to an exemplary embodiment of the present disclosure.

Referring to FIG. 2 and FIG. 3, the vehicle 1 may include an input device 101, a display device 102, a sound output device 103, a location receiver 104, a communicator 105, a terminal 106, a voice receiver 107, the controller 110, a storage device 111, an audio device 120, and a radar 130.

The input device 101 receives a user input and transmits input information on the received user input to the control unit 110*a*.

The input device 101 may directly transmit input information on user input to a processor 126 (see FIG. 3) of the audio device 120.

The input device 101 receives a command to play/stop a radio broadcast, and receives frequency information and volume information when playing the radio broadcast.

The input device 101 may also receive channel information for outputting the radio broadcast. For example, the channels may include a long wave channel, an amplitude (AM) channel, a shortwave channel, and FM channel.

The input device 101 may also receive a command to change the radio broadcast. The command to change the radio broadcast may include a command to change a frequency.

The input device 101 may receive a command to display broadcasting information while the radio broadcast is being played. The command to display broadcasting information may be a command to display broadcasting information regarding a currently outputting radio broadcast program.

The command to display broadcasting information may be a command to display broadcasting information on a previous program or a command to display broadcasting information a following program. The previous program may be a program corresponding to a frequency lower than the frequency of the currently outputting program.

The following program may be a program corresponding to a frequency higher than the frequency of the currently outputting program.

A current frequency, a frequency lower than the current frequency, and a frequency higher than the current frequency may be pre-stored information in order of size.

The current frequency, the frequency lower than the current frequency, and the frequency higher than the current frequency are frequencies receivable in the vehicle, and may be retrieved in order of size.

The input device 101 may receive the command to display broadcasting information corresponding to frequency information selected by a user. Furthermore, the input device 101 may receive a command to end the displaying of broadcasting information.

The input device 101 may receive a reservation command and reservation information of a radio broadcast, and a search command and search information of the radio broadcast.

The reservation information on radio broadcast may include a broadcasting time and may further include at least one of a broadcasting station name, host, program title, and frequency.

The search information on the radio broadcast may include at least one of program information, broadcasting station information, channel information, frequency information, host information, and broadcasting time information.

The input device 101 may also receive an operation command of the terminal 106. The input device 101 may receive a movement command and selection command of a cursor displayed on the terminal 106.

The input device 101 may be disposed on a center fascia and a head unit provided in an interior of a vehicle body, and may also be disposed on a steering wheel.

The input device 101 may include hardware devices, such as various buttons or switches, pedals, keyboards, mice, track-balls, levers, handles, sticks, or the like.

The input device 101 may include a graphical user interface (GUI), such as a touch pad, that is, a software device. The touch pad may be implemented as a touch screen panel (TSP) to form a multilayer structure with the display device 102.

The display device 102 displays operation information on functions being performed in the vehicle 1.

The display device 102 may display operation information of the head unit and input information input to the input device 101. For example, the display device 102 may display, when a radio broadcast is played, a channel and frequency input by a user and also display a volume.

The display device 102 may display, when the radio broadcast is played, broadcasting information corresponding to frequency information selected by a user.

The display device 102 may display, when the radio broadcast is played, broadcasting information corresponding to other frequency information.

The display device 102 may display broadcasting information of the radio broadcast output at the current location and a frequency of the same radio broadcast in another regions.

The display device 102 may display, when the radio broadcast is played, schedules of radio broadcasts being conducted by a plurality of broadcasting stations.

The display device 102 may display reserved reservation information and may display retrieved search information.

The display device 102 may display volume information when the radio broadcast is played.

The display device 102 may be disposed on at least one of a center fascia and a head unit provided inside a vehicle body, or may be disposed on a cluster.

The display device 102 may include a cathode ray tube (CRT), a digital light processing (DLP) panel, a plasma display panel (PDP), a liquid crystal display (LCD) panel, an electroluminescence (EL) panel, an electrophoretic Display (EPD) panel, an electrochromic display (ECD) panel, a light emitting diode (LED) panel, or an organic light emitting diode (OLED) panel, or the like, but is not limited thereto.

The sound output device 103 outputs a sound for a function being performed in the vehicle in response to a control command of the controller 110.

For example, the sound output device 103 may output an audio signal of navigation information as sound, output an audio signal of content or external broadcasting as sound, or output an audio signal of music or radio broadcasting selected by a user as sound.

When the radio broadcast is played, the sound output device 103 may output sound as volume information selected by a user in response to a control command of the controller 110.

The sound output device 103 may be connected to the audio device 120 to output an audio signal output from the audio device 120 as sound.

The sound output device 103 may include one or two or more speakers.

The location receiver 104 receives a signal for the current location of the vehicle.

The location receiver 104 may include a satellite signal receiver for receiving signals from a plurality of satellites and a signal processing unit of processing the satellite signals obtained by the satellite signal receiver. The signal processing unit may include software for obtaining current location information of the vehicle using distance information and time information corresponding to location signals of the plurality of satellites, and an output unit of outputting the obtained current location information of the vehicle.

The location receiver 104 may directly transmit the current location information of the vehicle to the processor 123 of the audio device 120.

The communicator 105 may include one or more components enabling communication with an external device, and may include, for example, at least one of a short-range communication module, a wired communication module, and a wireless communication module. Herein, the external device may be the satellite 2, the first and second servers 5 and 6, and the first and second infrastructures 3 and 4.

The short-range communication module may include various short-range communication modules that exchange signals using a wireless communication network at a short distance, such as a Bluetooth module, an infrared communication module, a Radio Frequency Identification (RFID) communication module, a Wireless Local Access Network (WLAN) communication module, a Near Field Communication (NFC) module, and a Zigbee communication module, and the like.

The wired communication modules may include various cable communications, such as Universal Serial Bus (USB), High Definition Multimedia Interface (HDMI), Digital Visual Interface (DVI), Recommended Standard (RS)-232, a power line communication, or a plain old telephone service (POTS) modules, as well as various wired communication modules, such as Controller Area Network (CAN) communication modules, Local Area Network (LAN) modules, Wide Area Network (WAN) modules, or Value Added Network (VAN) modules, and the like.

The wireless communication modules may include, in addition to the WiFi module and the WiBro module, Global System for Mobile communication (GSM), Code Division Multiple Access (CDMA), Wideband Code Division Multiple Access (WCDMA), Universal Mobile Telecommunications System (UMTS), Time Division Multiple Access (TDMA), or Long Term Evolution (LTE), and the like.

The communicator 105 may communicate with an external broadcasting station. The communicator 105 may further include a broadcasting communication module, such as transport protocol experts group (TPEG) (e.g., DMB), Sirius XM (SXM), and relational database service (RDS).

The terminal 106 may be an audio/video/navigation (AVN) device for performing audio, video, and navigation functions.

The terminal 106 may receive a user input and display operation information on at least one function selected by the user.

For example, the terminal 106 may receive an ON/OFF command of a navigation mode and destination information and route selection information when the navigation mode is executed. The terminal 106 may display navigation information.

The terminal 106 may display operation information of a mode being performed, such as a broadcasting mode, an Internet search mode, and a call mode. Herein, the broadcasting mode may include a radio broadcasting mode, a ground radio wave broadcasting mode, a cable broadcasting mode, a satellite broadcasting mode, an internet broadcasting mode, an internet protocol (IP) broadcasting mode, and a digital multimedia broadcasting (DMB) mode.

The terminal 106 may also display, when the radio broadcast is played, broadcasting information in response to a command of the controller 110.

The terminal 106 may also display broadcasting information transmitted from the audio device 120.

The terminal 106 may include a display panel. Furthermore, the terminal 106 may include a touch screen in which a touch panel is integrated with a display panel.

The voice receiver 107 receives a voice of a user.

The voice receiver 107 includes one or more microphones.

The voice receiver 107 may also include a microphone array.

The controller 110 may recognize a voice from the sound received by the voice receiver 107, recognize a user input based on the recognized voice, and transmit the recognized user input to at least one of the audio device 120 and the terminal 106.

The user input through voice recognition may include a reservation command and reservation information of a radio broadcast, and may include a search command and search information of a radio broadcast.

The user input through voice recognition may include selection information of any one of a plurality of radio broadcasting programs.

The controller 110 transmits input information input through the input device 101 to at least one of the audio device 120 and the terminal 106.

The controller 110 may also control operations of the audio device 120 and the terminal 106 based on the input information input through the input device 101.

The vehicle 1 may output, when a radio broadcast is played, the radio broadcast using the audio device 120 or may output the radio broadcast using the terminal 106. In an exemplary embodiment of the present disclosure, playing the radio broadcast through the audio device 120 will be described.

Upon receipt of a radio broadcast playback command through the input device 101, the controller 110 may transmit the received radio broadcast playback command to the audio device 120, and upon receipt of a channel and frequency through the input device 101, the controller 110 may transmit the received the channel and frequency to the audio device 120.

Upon receipt of a broadcasting information display command of a radio broadcast through the input device 101, the controller 110 may request the first server 5 to provide the broadcasting information.

When requesting the provision of broadcasting information to the first server 5, the controller 110 may identify the current location information and frequency information of the vehicle and transmit the identified current location information and frequency information of the vehicle to the first server 5. The controller 110 may transmit current time information and vehicle identification information together when requesting the first server 5 to provide broadcasting information.

The controller 110 may be configured for controlling the display device 102 or the terminal 106 to display the broadcasting information received from the first server 5.

At the present time, the controller 110 may be configured for controlling the display device 102 or the terminal 106 to display the broadcasting information when any one of: the broadcasting information display command, the radio broadcast change command, or the frequency change command is received through the input device 101.

The controller 110 may be an electronic control unit (ECU) provided in the vehicle 1.

In other words, the controller 110 and the processor 123 of the audio device 120 may be implemented as one or separately as in an exemplary embodiment of the present disclosure.

The controller 110 may be implemented with a memory storing data for an algorithm or a program reproducing the algorithm for controlling operations of components in the vehicle 1, and a processor performing the above-described operations using the data stored in the memory. In the instant case, the memory and the processor may be implemented as separate chips. Alternatively, the memory and the processor may be implemented as a single chip.

The storage device 111 may store vehicle identification information. The vehicle identification information may include a vehicle identification number, a manufacturing number, a model number, license plate information, a type of vehicle model, a model name of vehicle, and the like, and may further include user information.

The storage device 111 may also store a schedule.

The storage device 111 may store map information in which zones are divided and may store a frequency table for each zone of a plurality of broadcasting stations.

The storage device 111 may be implemented as at least one of a non-volatile memory device such as a cache, a Read Only Memory (ROM), a Programmable ROM (PROM), an erasable programmable ROM (EPROM), an Electrically Erasable Programmable ROM (EEPROM), and a flash memory, or a volatile memory device such as a Random Access Memory (RAM), or a storage medium such as a Compact Disk (CD)-ROM, but is not limited thereto. The storage may be a memory implemented as a separate chip from the processor described above in relation to the controller, or may be implemented as a single chip with the processor.

The audio device 120 may receive external broadcast signals and output the received broadcast signals. The audio device 120 may be a radio device provided in the head unit or an audio device provided in the head unit. The audio device 120 may be provided in the terminal 106.

The audio device 120 may perform merely a function of receiving a frequency signal and outputting a radio broadcast as sound.

The audio device 120 may receive a frequency signal to output a radio broadcast as sound, display broadcasting information or a schedule based on a user input received by the input device 101 or the voice receiver 107, and perform reservation and search functions. In the instant case, the audio device may include an input device and a display device. Furthermore, the audio device may directly communicate with the input device and the display device.

A configuration of the audio device 120 will be described with reference to FIG. 3.

As shown in FIG. 3, the audio device 120 may include a radio tuner 121, a broadcasting signal processor 122, a processor 123, and a memory 124.

The audio device 120 further includes an input unit, a display unit, a communication unit, and a sound output unit, and may further include a position receiver.

The radio tuner 121 may be connected to a broadcasting antenna and receive broadcasting signals through the broadcasting antenna. Herein, the broadcasting antenna may receive broadcast signals for radio broadcasts transmitted from a plurality of broadcasting stations.

The radio tuner 121 may receive broadcast signals corresponding to channel information and frequency information selected by a user during playback of a radio broadcast.

The radio tuner 121 may amplify the received frequency signals.

The radio tuner 121 may demodulate the amplified frequency signals and output signals in the audible frequency range. The signals output from the radio tuner 121 is amplified through an amplifier 103-1 of the sound output device 103 and then transmitted to a speaker 103-2.

The broadcasting signal processor 122 processes the demodulated signals demodulated by the radio tuner 121 and transmits signal processing information to the processor 123.

The broadcasting signal processor 122 may sample the demodulation signal, which is an analog signal output from the radio tuner 121, into a digital signal and obtain a signal strength of the sampled digital signal. The obtained signal strength may be electric field strength of the received signal.

Upon receipt of input information from the controller 110, the processor 123 may play a radio broadcast based on the received input information, and transmit broadcasting information to the controller 110 while playing the radio broadcast.

The received input information may include a radio broadcast playback command, broadcasting information, volume information, and a radio broadcast stop command, and may include current location information.

The broadcasting information may include at least one of channel information, frequency information, broadcasting station information, program information, broadcasting time information, and presenter information.

The processor 123 may activate the radio tuner 121 and the broadcasting signal processor 122 in response to the radio broadcast playback command.

The processor 123 may be configured for controlling the radio tuner 121 to receive broadcast signals corresponding to the channel information and frequency information selected by the user, and may be configured for controlling output of the broadcast signals received by the radio tuner 121.

The channel information and frequency information selected by the user may be information received through the input device 101 or the voice receiver 107.

The channel information and frequency information selected by the user may be information received through the controller 110.

When at least one broadcasting information among the program information, the broadcasting station information, the broadcast time information, and the host information is received, the processor 123 may identify the frequency information corresponding to the received at least one broadcasting information and based on the identified frequency information control the radio tuner 121.

The processor 123 may allow a user to listen to the radio broadcast by controlling an output of an audio signal within the received broadcast signal.

The processor 123 may adjust the output sound quality while controlling frequency maintenance when the received signal field strength is greater than or equal to a reference received signal field strength, and may display a schedule when the received signal field strength is less than the reference received signal field strength. Herein, the adjusting of the sound quality may include removing a noise signal from the broadcast signal.

The processor 123 may update a schedule for each region.

In response to the command to display broadcasting information being received, the processor 123 may identify the frequency information of the frequency signal received through the radio tuner 121, identify the broadcasting information corresponding to the identified frequency information, and transmit the identified broadcasting information to the controller 110.

The command to display broadcasting information may be a command received through the input device 101 or the voice receiver 107.

The command to display broadcasting information may be a command received through the controller 110.

The processor 123 may also control the display device 102 or the terminal 106 to display broadcasting information.

In response to the command to display schedule being received, the processor 123 may request the first server 5 to provide a schedule and transmit the schedule received from the first server 5 to the controller 110.

The processor 123 may also control the display device 102 or the terminal 106 to display the schedule.

The command to display schedule may be a command received through the input device 101 or the voice receiver 107.

The command to display schedule may be a command received through the controller 110.

The processor 123 may also perform communication with the first server 5 through the communicator 105. The processor 123 may perform communication with the first server 5 through the communicator 105 and the first infrastructure 3 and may also perform communication with the location receiver.

The processor 123 may request the first server 5 to provide broadcasting information or the schedule.

When requesting the first server 5 to provide the broadcasting information, the processor 123 may identify the current location information and frequency information of the vehicle, and transmit the identified current location information and frequency information of the vehicle to the first server 5. When requesting the first server 5 to provide the broadcasting information, the processor 123 may transmit current time information and vehicle identification information together.

When requesting provision of broadcasting information to the first server 5, the processor 123 may also transmit the broadcast station information of the currently output radio broadcast to the first server.

The processor 123 may be configured for controlling the display device 102 or the terminal 106 to display the broadcasting information received from the first server 5.

The processor 123 may request the first server 5 to provide the schedule.

When requesting provision of the schedule to the first server 5, the processor 123 may identify the current location information of the vehicle and transmit the identified current location information of the vehicle to the first server 5. The processor 123 may transmit the current time information and vehicle identification information together when requesting provision of the schedule to the first server 5.

In response to the schedule being received from the first server 5, the processor 123 may be configured for controlling the display device 102 or the terminal 106 to display the received schedule.

The processor 123 may identify the current location information of the vehicle based on a command to display a broadcast list, and display a radio broadcast list audible at the current location based on the identified current location information of the vehicle.

The memory 124 may store the schedule and may further store the vehicle identification information.

The memory 124 may also store the schedule for each region.

At least one component may be added or deleted corresponding to the performance of components of the vehicle shown in FIG. 2 and FIG. 3. Furthermore, it should be easily understood by those skilled in the art that the mutual positions of the components may be changed corresponding to the performance or structure of the system.

On the other hand, each component shown in FIG. 2 and FIG. 3 refers to software and/or hardware components such as a Field Programmable Gate Array (FPGA) and an Application Specific Integrated Circuit (ASIC).2 and 3, components controllable by the controller 110 of the vehicle and components controllable by the processor 123 of the audio device 120 have been described.

With reference to FIG. 2 and FIG. 3, components controllable by the controller 110 of the vehicle and components controllable by the processor 123 of the audio device 120 have been described.

However, based on the function of the processor 123 of the audio device 120, an operation configuration between the controller 110 of the vehicle and the processor 123 of the audio device 120 may be different, which is briefly explain as follows.

An example in which the processor 123 of the audio device 120 is configured to perform only a function for outputting radio broadcast will be described.

The controller 110 of the vehicle may identify the user input received through the input device 101 and the user input corresponding to the voice received through the voice receiver 107, and control the audio device 120 based on the identified user input, outputting the radio broadcast.

The processor 123 of the audio device 120 may identify the frequency information corresponding to the user input and control the tuner based on the identified frequency information, outputting the radio broadcast.

The controller 110 of the vehicle may be configured for controlling at least one of the display device 102 and the terminal 106 to: communicate with the first server 5 through the first infrastructure 3, transmit the frequency information, the current location information, the vehicle identification information, and the current time information to the first server 5, and output the broadcasting information and schedule received from the first server 5.

The controller 110 of the vehicle may reserve the radio broadcast based on the reservation command and reservation information, and may be configured for controlling the radio device 120 based on the reservation information.

The controller 110 of the vehicle may be configured for controlling at least one of the display device 102 and the terminal 106 to search for the broadcasting information on radio broadcast based on the search command and search information and to display the searched broadcasting information.

An example in which the processor 123 of the audio device 120 is configured to perform various control functions in addition to the function for outputting radio broadcast will be described.

The controller 110 of the vehicle 1 may identify the user input received by the input device 101 and the user input corresponding to the voice received by the voice receiver 107, and transmit the identified user input to the audio device 120. Herein, the user input may include a command to play/stop radio broadcast, a reservation command, reservation information, search information, a search command, and broadcasting information.

The processor 123 of the audio device 120 may identify the frequency information corresponding to the user input, and control the radio tuner 121 based on the identified frequency information, outputting the radio broadcast.

The processor 123 of the audio device 120 may communicate with the first server 5 through the first infrastructure 3, provide the first server 5 with the frequency information, the current location information, the vehicle identification information, and the current time information, and transmit the broadcasting information and schedule received from the first server 5 to the controller 110.

At the present time, the controller 110 may be configured for controlling at least one of the display device 102 and the terminal 106 to display the broadcasting information and schedule received from the processor 123.

The processor 123 of the audio device 120 may directly control at least one of the display device 102 and the terminal 106 to display the broadcasting information and schedule received from the first server 5.

The processor 123 of the audio device 120 may perform reservation of the radio broadcast based on the reservation command and reservation information, control output of the radio broadcast based on the reservation information, and search for the radio broadcast based on the search command and search information.

The processor 123 of the audio device 120 may transmit the broadcasting information on the searched radio broadcast to the controller 110. The controller 110 may be configured for controlling at least one of the display device 102 and the terminal 106 to display the received broadcasting information.

Figure 4:
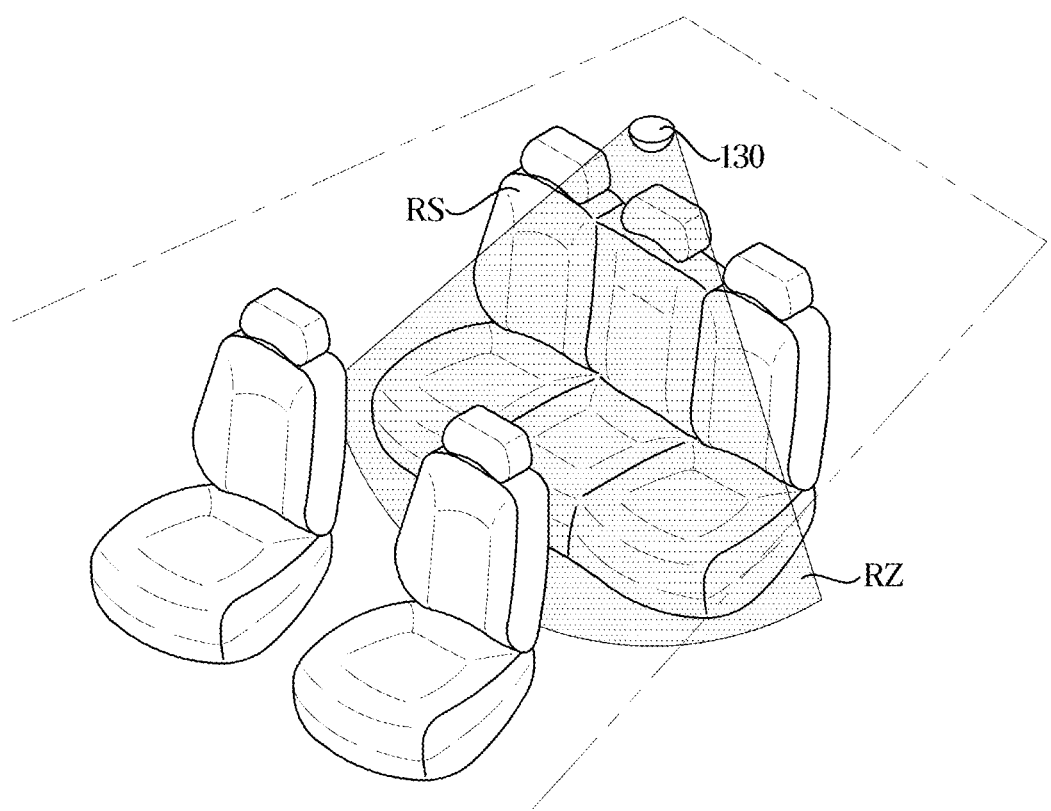
FIG. 4 is a schematic diagram of a radar provided in a vehicle according to an exemplary embodiment of the present disclosure.

FIG. 4 is a view exemplarily illustrating a configuration of a radar provided in a vehicle according to an exemplary embodiment of the present disclosure.

Referring to FIG. 4, the radar 130 provided in the vehicle 1 may be a high-precision radar used in a rear occupation alert (ROA) system. To prevent accidents which may occur when there is a passenger remaining in a rear seat of the vehicle while an of the vehicle is turned off, a rear seat passenger notification function is a function that notifies the presence of a passenger by use of a cluster notification or a horn or lamp in the vehicle step by step when the engine of the vehicle is turned off.

The radar 130 is mounted on a ceiling of the vehicle corresponding to the rear seat (second row and/or third row) of the vehicle, and is used to detect a passenger (humans, animals) positioned on the rear seats.

The radar 130 transmits a signal using radio waves, and detects a movement of a rear seat passenger from a change in a signal returned by the transmitted signal being reflected to a passenger presenting in the rear seat (RS).

A rear seat detection area RZ, which is a detection area of the radar 130, may be the second row and/or the third row of the vehicle 1. RZ may be appropriately adjusted according to the size of the rear seat of the vehicle 1. As an exemplary embodiment of the present disclosure, FIG. 4 shows a radial detection area capable of covering the entire second row of the vehicle.

The radar 130, which is provided with a high-performance microchip, may efficiently perform complex signal processing, such as setting the size of an object to be detected, moving patterns, moving changes, and removing noise components. This may detect not only general movements of the passenger in the rear seat, but also biometric information, such as minute movements that occur when body movements of his or her are stopped, such as pulse rate and respiration. In other words, the radar 130 may detect minute movements of the stomach and chest that occur when a baby sleeping well in a vehicle seat breathes.

For example, the radar 130 may include an impulse-radio ultra wideband (IR-UWB) sensor and a frequency-modulated continuous-wave (FMCW) radar, and a Doppler radar, and the like to detect even a fine bio-signal of a rear seat passenger in a non-contact manner.

Radar data detected by the radar 130 may be transmitted to the controller 110.

The controller 110 may be configured to determine whether there is a passenger in the rear seat of the vehicle 1 based on the radar data received from the radar 130 and determine a position of the passenger in the rear seat and whether the passenger in the rear seat is sleeping.

Figure 5:
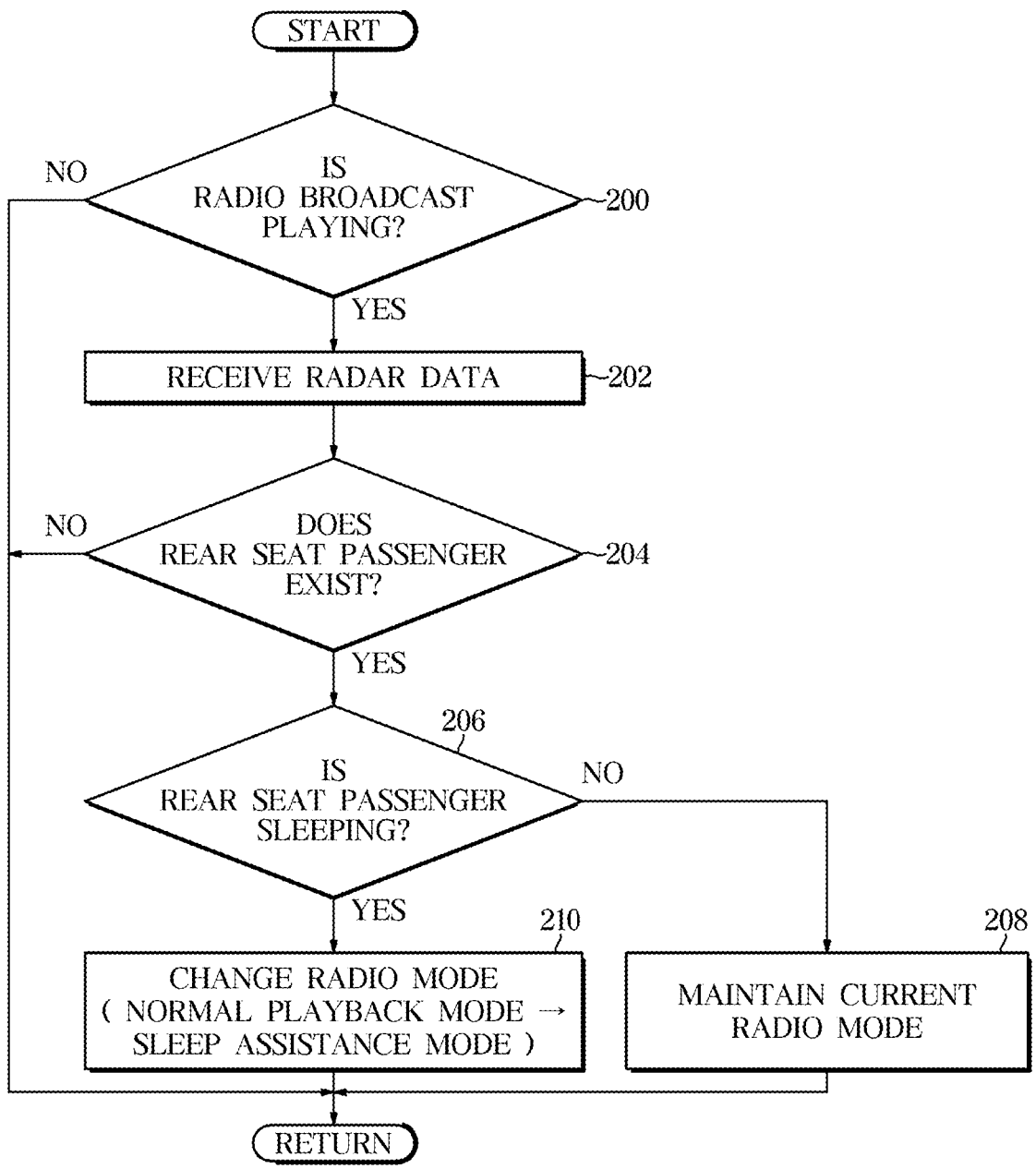
FIG. 5 is a flowchart illustrating an operation of a vehicle according to an exemplary embodiment of the present disclosure.

FIG. 5 is a flowchart illustrating an operation of a vehicle according to an exemplary embodiment of the present disclosure.

Referring to FIG. 5, the vehicle 1 may be configured to determine whether the audio device 120 is playing a radio broadcast (200).

The controller 110 may be configured to determine whether the radio broadcast is playing based on a state of the audio device 120. For example, when the audio device 120 is turned on and a radio mode is running, the controller 110 may be configured to determine that the radio broadcast is playing.

If the radio broadcast is playing (Yes in 200), the vehicle 1 may receive radar data from the radar 130 (202).

The controller 110 may receive the radar data from the radar 130.

The radar 130 is mounted on the ceiling of the second and/or third row rear seats of the vehicle 1. The radar may transmit the radar signal with respect to RZ formed radially from the ceiling of the rear seat to the rear seat side, generate radar data from the radar signal returned by reflection of the transmitted radar signal to a passenger present in the rear seat, and transmit the generated radar data to the controller 110.

The vehicle 1 may be configured to determine whether a rear seat passenger exists in the rear seat based on the radar data (204).

The controller 110 may be configured to determine whether there is movement of an object in RZ based on the radar data received from the radar 130. The controller 110, based on the radar data, may detect relatively large movements as well as minute movements that occur in a state in which body movements of his or her are stopped, such as pulse rate and respiration. The controller 110 may be configured to determine whether there is the passenger in the rear seat based on the change in movement.

Based on the radar data received from the radar 130, the controller 110 may detect the presence or absence of the rear seat passenger as well as the position of the rear seat passenger. The controller 110 may be configured to determine the position of the rear seat passenger from the position of the rear seat where the movement of an object appears.

If the rear seat passenger exists (Yes in 204), the vehicle 1 may be configured to determine whether the rear seat passenger is sleeping (206).

The controller 110 may be configured to determine whether the rear seat passenger is sleeping based on changes in the body of the rear seat passenger.

For example, based on radar data, the controller 110 generates a biometric change indicator that indicates biometric change characteristics of the rear seat passenger, such as a heart rate, a respiration rate, and a movement, and compares the biometric change indicator with a preset sleep pattern indicator which is generally seen in the rear seat passenger who is falling asleep or has fallen asleep.

If the rear seat passenger is not sleeping (No in 206), the vehicle 1 may maintain a current radio mode (208).

The current radio mode may be a normal playback mode to which a sleep assistance mode for assisting the rear seat passenger to sleep is not applied. The normal playback mode may be a basic radio mode.

Meanwhile, if the rear seat passenger is sleeping (Yes in 206), the vehicle 1 may switch the radio mode from the current normal playback mode to the sleep assistance mode (210).

Thereafter, if a wake-up of the rear seat passenger is detected, the vehicle 1 may return the radio mode from the sleep assistance mode to the normal playback mode.

The sleep assistance mode is a sleep playback mode that helps deep sleep without disturbing the sleep of the rear seat passenger who falls asleep while listening to the radio broadcast.

The controller 110 may appropriately change a radio frequency and/or radio sound quality to assist the sleep of the rear seat passenger in the sleep assistance mode.

The controller 110 may change the radio frequency in the sleep assistance mode. For example, the controller 110 may change the frequency of the radio tuner 121 through the processor 123 of the audio device 120.

The controller 110 may change the current radio broadcast to different radio broadcast which is more conducive to sleep than the radio broadcast currently playing.

Furthermore, the controller 110 may change the radio sound quality in the sleep assistance mode. For example, the controller 110 may change the radio sound quality by changing a tuning parameter of the radio tuner 121 through the processor 123 of the audio device 120.

The controller 110 may change the sound quality of the current radio to different sound quality of the radio which is more conducive to sleep than that of the radio currently playing.

Accordingly, according to an exemplary embodiment of the present disclosure, if the rear seat passenger listening to the radio broadcast falls asleep, the radio mode is changed from the normal playback mode to the sleep assistance mode to help the sleep of the rear seat passenger. Consequently, the sleep of the sleeping rear seat passenger may not be disturbed and the sleeping rear seat passenger may sleep more soundly.

Figure 6:
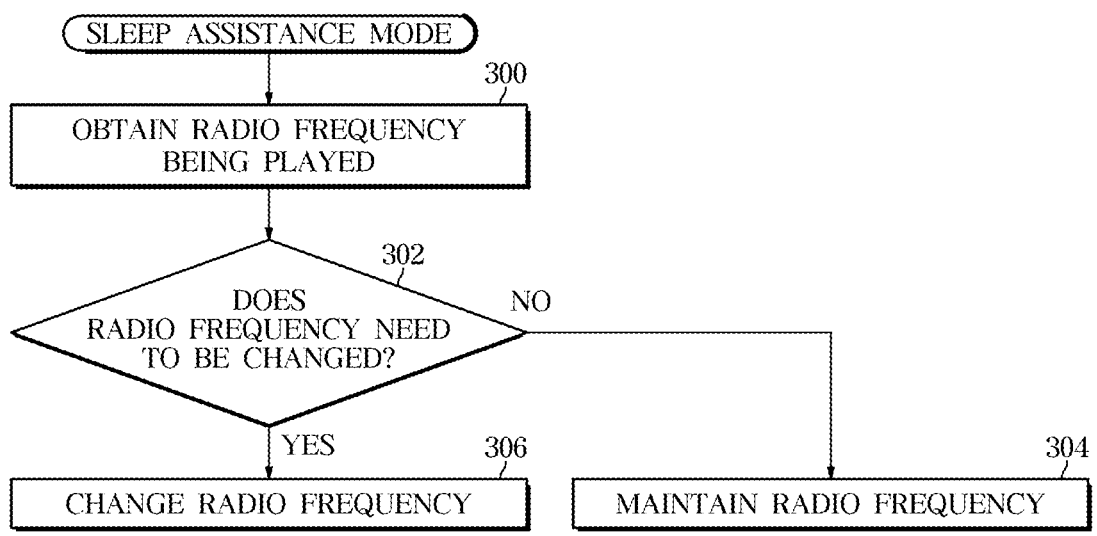
FIG. 6 is a flowchart illustrating changing a radio frequency in a sleep assistance mode in a vehicle according to an exemplary embodiment of the present disclosure.

FIG. 6 is a flowchart illustrating changing a radio frequency in the sleep assistance mode in a vehicle according to an exemplary embodiment of the present disclosure.

Referring to FIG. 6, after the sleep assistance mode is executed, the vehicle 1 may obtain the radio frequency being played in the sleep assistance mode (300).

The vehicle 1 may be configured to determine whether the radio frequency needs to be changed based on the radio frequency being played (302).

Upon determining that the radio frequency being played is not a radio broadcast frequency conducive to sleep, the vehicle 1 may be configured to determine that the radio frequency needs to be changed. A list of radio frequencies that are conducive to sleep and radio frequencies that are not may be stored in advance.

If the vehicle 1 does not need to change the radio frequency (No in 302), the vehicle 1 may maintain the current radio frequency (304).

Meanwhile, if the vehicle 1 needs to change the radio frequency (Yes in 302), the vehicle 1 may change the current radio frequency to different radio broadcast frequency conducive to sleep to change the current radio broadcast to a radio broadcast which is more conducive to sleep than the radio broadcast currently playing (306). The frequencies of radio broadcasts conducive to sleep may be stored in advance.

Furthermore, the frequencies of radio broadcasts conducive to sleep may be searched and found according to predetermined conditions in the schedule of radio broadcast.

FIG. 7A and FIG. 7B are views exemplarily illustrating changing a radio frequency in the sleep assistance mode of a vehicle according to an exemplary embodiment of the present disclosure.

Referring to FIG. 7A and FIG. 7B, the display device 102 may display radio broadcasting information as at least one of text and image.

The display device 102 may display frequency information M1 selected by the user and radio broadcasting information M2, such as radio channel information and radio station name.

If Traffic Broadcasting System (TBS) (95.1 MHz), which is a radio station playing in the sleep assistance mode, is included in the list of radio broadcasts that are not conducive to sleep, 'TBS 95.1 MHz', which is the radio frequency being played, may be changed to 'Korea Broadcasting System (KBS) 1 FM (Classic FM) 93.1 MHz', which is a classic music broadcast conductive to sleep. 'KBS 1 FM (Classic FM) 93.1 MHz' may be a radio frequency preferred by the user in the sleep assistance mode, or may be a radio frequency stored by the user. Furthermore, if there is no radio frequency stored by the user in the sleep assistance mode, 'KBS 1 FM (Classic FM) 93.1 MHz' may be a recommended radio frequency. The recommended radio frequency is a radio frequency provided and stored from a server, and may be a radio frequency of a radio broadcast commonly used in a big data analysis result according to the use of the sleep assistance mode.

Figure 8:
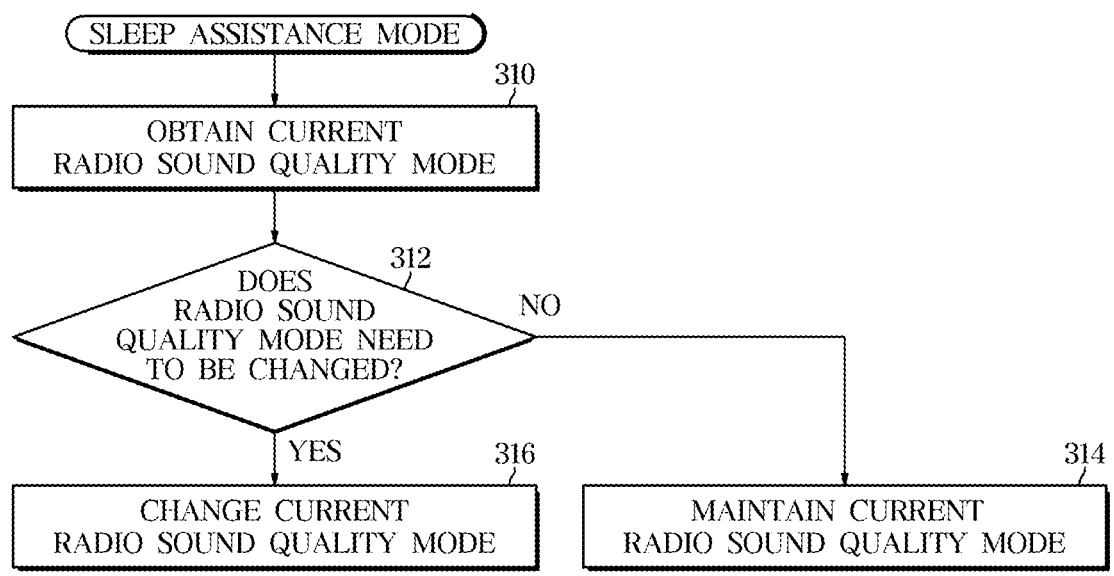
FIG. 8 is a flowchart illustrating changing radio sound quality in a sleep assist mode in a vehicle according to an exemplary embodiment of the present disclosure.

FIG. 8 is a flowchart illustrating changing radio sound quality in the sleep assistance mode in a vehicle according to an exemplary embodiment of the present disclosure.

Referring to FIG. 8, after the sleep assistance mode is executed, the vehicle 1 may obtain a radio sound quality mode currently set in the vehicle 1 in the sleep assistance mode (310). In the instant case, the currently playing radio broadcast may be a radio broadcast originally being played, or a radio broadcast whose radio frequency of the current radio broadcast is changed to a radio broadcast frequency conducive to sleep due to the detection of the sleep of the rear seat passenger.

The vehicle 1 may be configured to determine whether the radio sound quality mode needs to be changed based on the currently set radio sound quality mode (312). Furthermore, the vehicle 1 may determine whether the radio sound quality mode needs to be changed based on a type of the currently set radio sound quality mode.

If the currently set radio sound quality mode is not a radio sound quality mode conducive to sleep, the vehicle 1 may be configured to determine that the radio sound quality mode needs to be changed. A list of radio sound quality modes that are conducive to sleep and radio sound quality modes that are not may be stored in advance.

If the vehicle 1 does not need to change the radio sound quality mode (No in 312), the vehicle 1 may maintain the current radio sound quality mode (314).

Meanwhile, if the vehicle 1 needs to change the radio sound quality mode (Yes in 312), the vehicle 1 may change the currently set radio sound quality mode to a radio sound quality mode conducive to sleep (316). The radio sound quality mode conducive to sleep may be stored in advance.

On the other hand, the vehicle 1 may change the radio sound quality mode based on electric field conditions (e.g., signal/noise level) of the radio tuner 121 together with the type of radio sound quality mode currently set in the vehicle 1 in the sleep assistance mode.

The vehicle 1 may obtain the type of the currently set radio sound quality mode and the electric field conditions (e.g., signal/noise level) of the radio tuner 121, and determine whether a change of the radio sound quality mode is necessary based on the type of the currently set radio sound quality mode and the electric field conditions.

For example, if the currently set radio sound quality mode is a radio sound quality mode which is not conducive to sleep due to high noise and the electric field condition is also bad, such as the electric field strength of the received radio signal being lower than the predetermined reference signal field strength, the vehicle 1 may be configured to determine that the radio sound quality mode needs to be changed. In the instant case, the vehicle 1 may change the currently set radio sound quality mode to the radio sound quality mode conducive to sleep.

Figure 9:
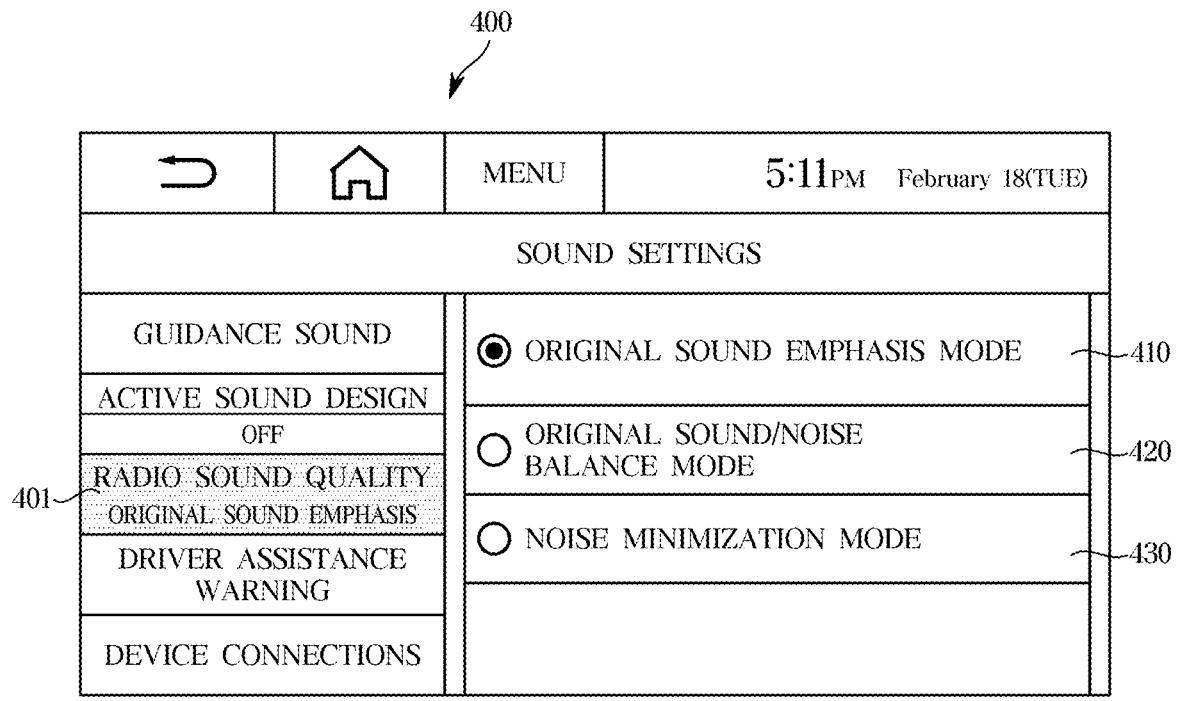
FIG. 9 is a flowchart illustrating changing a radio sound quality mode from an original sound emphasis mode to a noise minimization mode in a sleep assistance mode of a vehicle according to an exemplary embodiment of the present disclosure.

FIG. 9 is a configuration illustrating changing the radio sound quality mode from an original sound emphasis mode to a noise minimization mode in the sleep assistance mode of a vehicle according to an exemplary embodiment of the present disclosure.

Referring to FIG. 9, the display device 102 may display a sound setting screen 400 for setting vehicle sounds. The sound setting screen 400 may include a radio quality button 401 provided so that the user may select a radio sound quality to improve the quality of the radio sound.

For example, the radio quality button 401 may be an FM Radio Noise Control button configured to select radio sound quality by controlling FM radio noise.

When the user selects the radio quality button 401, the controller 110 may display mode selection buttons 410, 420, and 430 for selecting radio sound quality modes on the display device 102. For example, mode selection buttons may include an original sound emphasis mode 410, an original sound/noise balance mode 420, and a noise minimization mode 430, and the like.

The user may select a desired radio sound quality mode by selecting a mode selection button according to his or her preference.

The original sound emphasis mode 410 may provide radio sound quality faithful to the original sound of the radio broadcast. The controller 110 may minimize noise reduction for the acoustic signal by a noise reduction module (or algorithm) and convert the received radio broadcasting signal into sound as it is.

In contrast, the noise minimization mode 430 may provide radio sound quality by minimizing noise mixed with the received signal of radio broadcast. The noise minimization mode may maximize noise reduction of the acoustic signal by a noise reduction module (or algorithm) and output sound with the maximum noise reduction.

The original sound/noise balance mode 420 may provide radio quality in which noise mixed with the acoustic signal is reduced at an intermediate level between the original sound emphasis mode 410 and the noise minimization mode 430.

For example, in the original sound emphasis mode 410, the original sound/noise balance mode 420, and the noise minimization mode 430, tuning parameters of the radio tuner 121 are set differently according to characteristics of each mode. For example, the tuning parameters may include frequency, amplitude, noise, gain, and the like. Furthermore, other types of tuning parameters are also available.

The noise minimization mode 430 may be determined as radio quality more conducive to sleep than the original sound emphasis mode 410 and the original sound/noise balance mode 420. The original sound/noise balance mode 420 may be determined as radio quality more conducive to sleep than the original sound emphasis mode 410.

If the radio sound quality mode is set to the original sound emphasis mode 410 in the sleep assistance mode, the controller 110 may automatically change the radio sound quality mode from the original sound emphasis mode 410 to the noise minimization mode 430 to assist the sleep of the rear seat passenger.

On the other hand, the original sound emphasis mode 410 provides excellent radio sound quality to a driver when the electric field strength of the radio broadcasting signal is strong, but sound mixed with strong noise may be provided when the electric field strength of the radio broadcasting signal is weak.

The noise minimization mode 430 may provide sound in which noise mixed with the received radio broadcasting signal is maximally reduced even when the electric field strength of the received radio broadcasting signal is weak.

The original sound/noise balance mode may provide a relatively medium level of radio sound quality regardless of the electric field strength of the received radio broadcasting signal.

The controller 110 may automatically change the radio sound quality mode being played depending on the electric field strength of the received radio broadcasting signal in the sleep assistance mode.

The controller 110 may change the currently set original sound emphasis mode 410 to the original sound/noise balance mode 420 when the electric field strength of the received radio broadcasting signal in the sleep assistance mode is lower than the predetermined reference strength.

The controller 110 may change the currently set original sound emphasis mode 410 to the noise minimization mode 430 when the electric field strength of the received radio broadcasting signal in the sleep assistance mode is lower than the predetermined reference strength by a preset value or more than the preset value.

Figure 10:
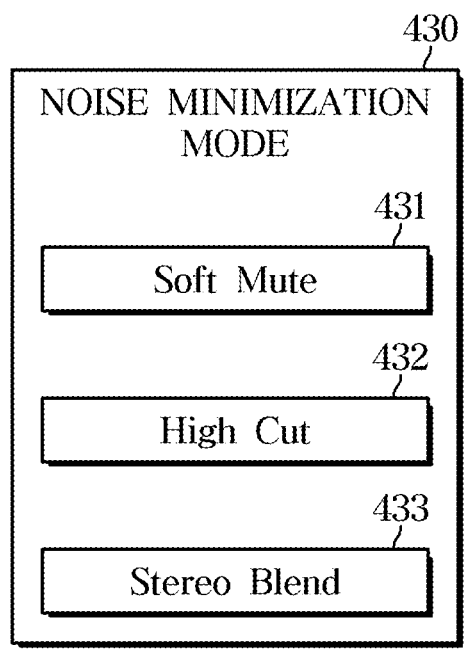
FIG. 10 is a view exemplarily illustrating detailed modes of a noise minimization mode of FIG. 9.

FIG. 10 is a view exemplarily illustrating detailed modes of the noise minimization mode of FIG. 9.

Referring to FIG. 10, the noise minimization mode 430 may include a soft-mute mode 431, a high-cut mode 432, and a stereo blend mode 433 of which the radio tuner 121 utilizes fixed tuning parameters for noise minimization.

In the noise minimization mode 430, the tuning parameters of the radio tuner 121 are set differently to minimize noise. In the noise minimization mode 430, the tuning parameters of the radio tuner 121 are set differently according to noise characteristics of each mode. For example, the tuning parameters may include the electric field strength of the received signal, ultrasonic noise, gain, and the like.

The noise minimization mode 430 may be any one of the soft-mute mode 431, the high-cut mode 432, and the stereo blend mode 433.

The soft-mute mode 431 may be used to mute sound in low signal sensitivity conditions to prevent static noise from hindering comfort of end user's listening. For example, the tuning parameter of the soft-mute mode 431 may be −20 to 0 dBuV for electric field strength and 40 to 80% for ultrasonic noise.

The high-cut mode 432 defines clamping down of high frequencies in cases where electric field strength, multipath, or neighboring channels exceed a certain level. For example, the tuning parameter of the high-cut mode 432 may be 5 to 40 dBuV for electric field strength and 10 to 60% for ultrasonic noise.

The stereo blend mode 433 improves the overall listening experience of the user in harsh environments by blending a stereo signal into a mono signal, and converting the blended signal back from mono to stereo when the electric field conditions become better. For example, the tuning parameter of the stereo blend mode 433 may be 30 to 50 dBuV for electric field strength and 30 to 10% for ultrasonic noise.

In the sleep assistance mode, the currently set original sound emphasis mode 410 is changed the noise minimization mode 430, and may be changed to the soft-mute mode 431, the high-cut mode 432, and the stereo blend mode 433.

Unlike sound tuning, radio reception tuning may set electric field conditions in the radio tuner 121, and accordingly, control output signals and noise. In an exemplary embodiment of the present disclosure, to assist the rear seat passenger in the sleep assistance mode, the noise minimization mode 430 that includes a soft-mute function, a high cut function, or a stereo blend function may be provided.

Figure 11:
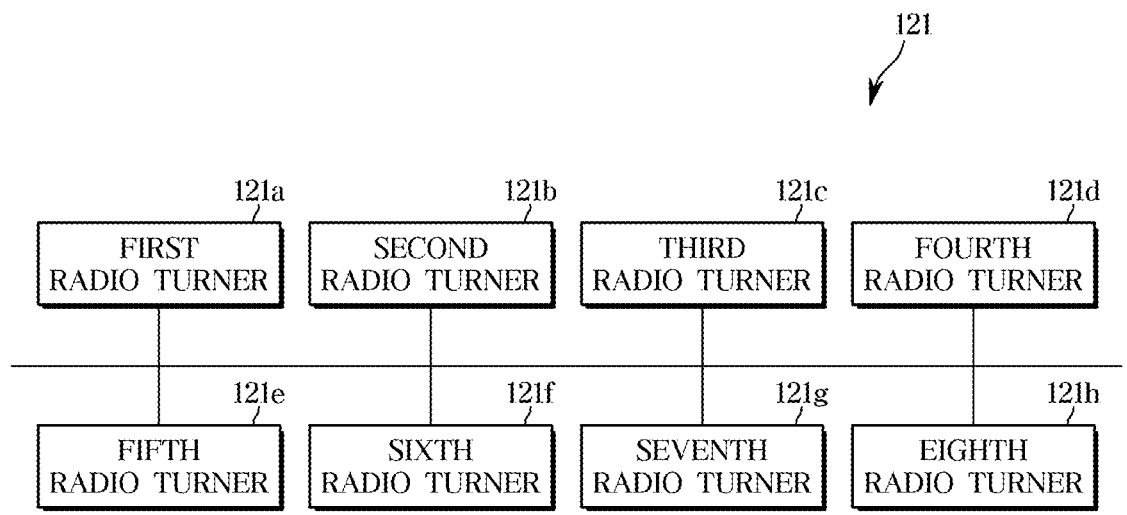
FIG. 11 is a view exemplarily illustrating radio tuners provided in a vehicle according to another exemplary embodiment of the present disclosure.
Figure 12:
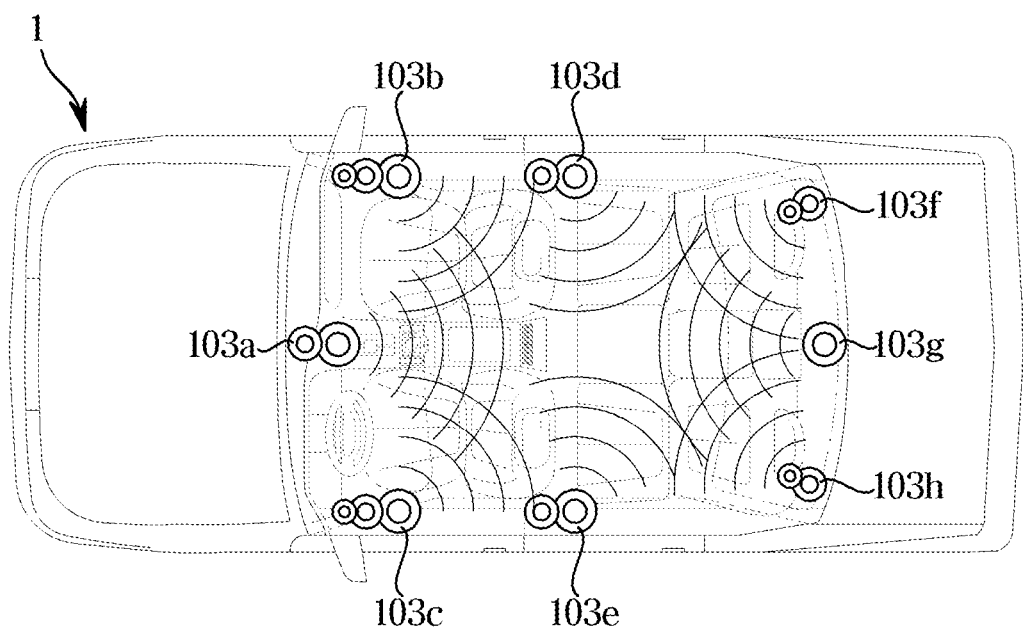
FIG. 12 is a view exemplarily illustrating individual control of tuning parameters of a radio tuner corresponding to a sound output device for each seat in a vehicle according to another exemplary embodiment of the present disclosure.

FIG. 11 is a view exemplarily illustrating radio tuners provided in a vehicle according to another exemplary embodiment of the present disclosure, and FIG. 12 is a view exemplarily illustrating individually controlling tuning parameters of the radio tuner corresponding to sound output devices for each seat in a vehicle according to another exemplary embodiment of the present disclosure.

Referring to FIG. 11 and FIG. 12, the radio tuners 121 may be provided in plurality.

By use of multiple radio tuners instead of a single radio tuner to output sounds reflecting respective tuning parameters to each of speakers of a driver seat, a front passenger seat, and a rear seat, noise-reduced sounds necessary for sleep assistance may be output to the sleeping rear seat passengers and clear sound may be output to other occupants such as drivers and passengers.

The radio tuner 121 is divided into a radio tuner applied to a first row seat speaker and a radio tuner applied to a second row seat speaker so that the first row seat speaker and the second row seat speaker may output sounds of different radio sound quality.

For example, the radio tuner 121 may include a first radio tuner 121a, a second radio tuner 121b, a third radio tuner 121c, a fourth radio tuner 121d, a fifth radio tuner 121e, a sixth radio tuner 121f, a seventh radio tuner 121g, and an eighth radio tuner 121h.

The radio tuners 121a, 121b, 121c, 121d, 121e, 121f, 121g and 121h may be provided to correspond to the eight sound output devices 103a, 103b, 103c, 103d, 103e, 103f, 103g and 103h provided in the driver seat, the front passenger seat, and the rear passenger seat of the vehicle 1, respectively.

The radio tuner 121 may reduce sharp-sounding noise according to a processing method among noise from an analog radio, or widen a received bandwidth so that the original sound may be heard as clearly as possible. In other words, sound may be output according to the condition of the listener for each seat.

Figure 13:
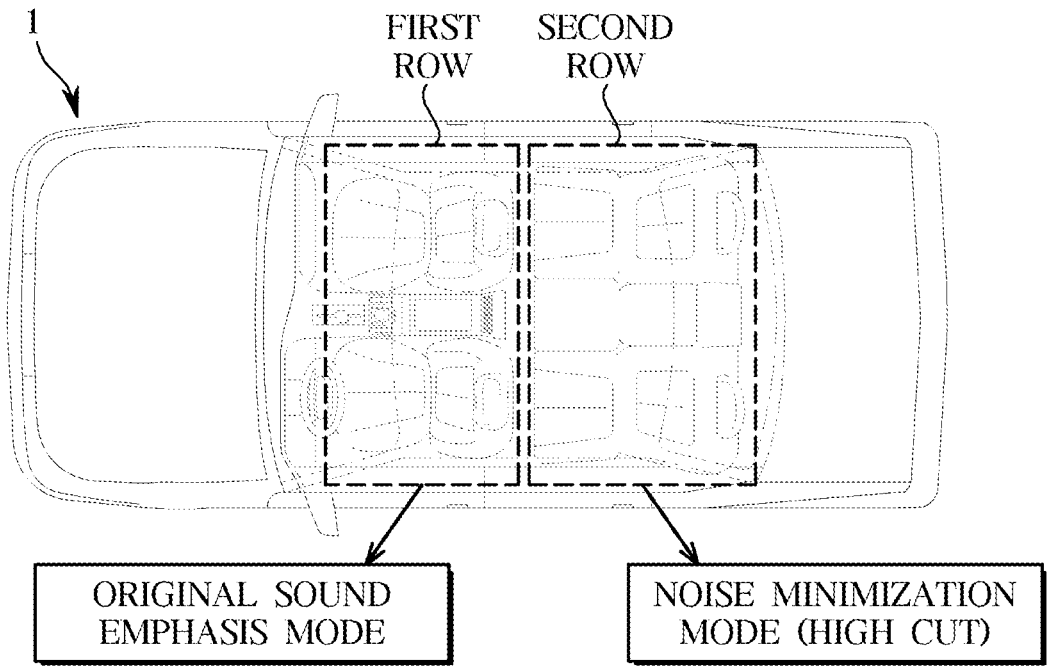
FIG. 13 is a view exemplarily illustrating a first example in which an original sound emphasis mode is applied to seats in a first row and a high-cut mode of a noise minimization mode is applied to seats in a second row in a sleep assistance mode of a vehicle according to another exemplary embodiment of the present disclosure.

FIG. 13 is a view exemplarily illustrating a first example in which the original sound emphasis mode is applied to the first row seat and the high-cut mode among the noise minimization modes is applied to the second row seat, in the sleep assistance mode of a vehicle according to another exemplary embodiment of the present disclosure.

Referring to FIG. 13, in the sleep assistance mode, the controller 110 may apply the original sound emphasis mode 410 to the first row seat and the high-cut mode 432 among the noise minimization mode 430 to the second row seat with the sleeping rear seat passengers.

Accordingly, the controller 110 may provide the original radio sound quality to the driver and/or passenger in the first row seats who are not sleeping, and provide the radio sound quality with minimized noise due to the high-cut function to the sleeping rear seat passenger in the second row seat.

As a result, the controller 110 may output sound faithful to the original sound of the radio to the driver and/or passenger in the first row seat who are not sleeping, and also output sound with minimized noise due to the high-cut function to the rear seat passenger in the second row seat who is sleeping, so that the sleeping rear seat passenger may fall into a deep sleep without disturbing his or her sleep.

Figure 14:
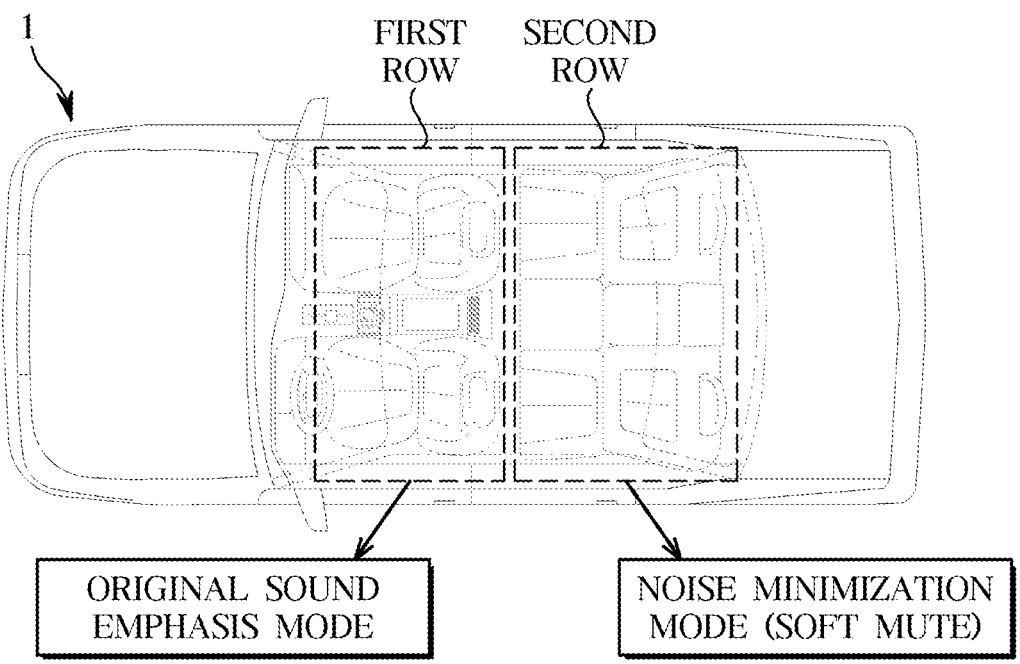
FIG. 14 is a view exemplarily illustrating a second example in which an original sound emphasis mode is applied to seats in a first row and a soft-mute mode of a noise minimization mode is applied to seats in a second row of which a rear passenger is sleeping in a vehicle according to another exemplary embodiment of the present disclosure.

FIG. 14 is a view exemplarily illustrating a second example in which the original sound emphasis mode is applied to the first row seat and the soft-mute mode among the noise minimization modes is applied to the second row seat with the sleeping rear seat passenger in a vehicle according to another exemplary embodiment of the present disclosure.

Referring to FIG. 14, in the sleep assistance mode, the controller 110 may apply the original sound emphasis mode 410 to the first row seat and the soft-mute mode 431 among the noise minimization mode 430 to the second row seat with sleeping rear seat passenger.

Accordingly, the controller 110 may provide the original radio sound quality to the driver and/or passenger in the first row seats who are not sleeping, and provide the radio sound quality with minimized noise due to the soft-mute function to the sleeping rear seat passenger in the second row seat.

As a result, the controller 110 may output sound faithful to the original sound of the radio to the driver and/or passenger in the first row seat who are not sleeping, and also output sound with minimized noise due to the soft-mute function to the rear seat passenger in the second row seat who is sleeping, so that the sleeping rear seat passenger may fall into a deep sleep without disturbing his or her sleep.

Figure 15:
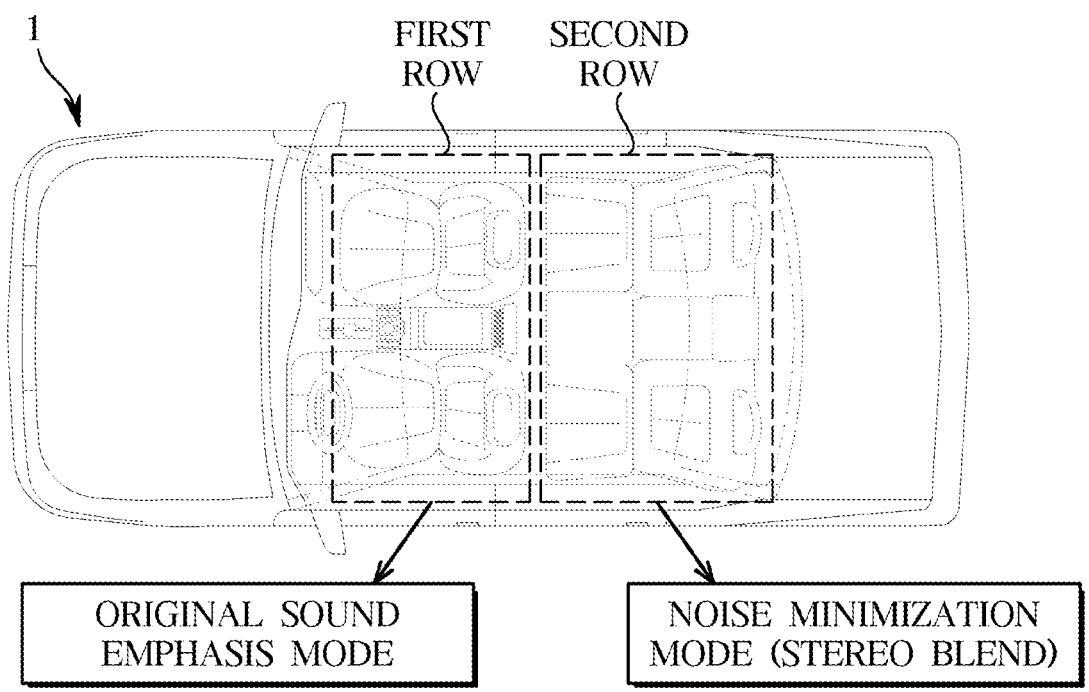
FIG. 15 is a view exemplarily illustrating a third example in which an original sound emphasis mode is applied to seats in a first row and a stereo blend mode of a noise minimization mode is applied to seats in a second row of which a rear seat passenger is sleeping in a sleep assistance mode of a vehicle according to another exemplary embodiment of the present disclosure.

FIG. 15 is a third example in which the original sound emphasis mode is applied to the first row seat and the stereo blend mode among the noise minimization modes is applied to second row seat with sleeping rear seat passenger in a vehicle according to another exemplary embodiment of the present disclosure.

Referring to FIG. 15, in the sleep assistance mode, the controller 110 may apply the original sound emphasis mode 410 to the first row seat and the stereo blend mode 433 among the noise minimization mode 430 to the second row seat with sleeping rear seat passenger.

Accordingly, the controller 110 may provide the original radio sound quality to the driver and/or passenger in the first row seats who are not sleeping, and provide the radio sound quality with minimized noise due to the stereo blend function to the sleeping rear seat passenger in the second row seat.

As a result, the controller 110 may output sound faithful to the original sound of the radio to the driver and/or passenger in the first row seat who are not sleeping, and also output sound with minimized noise due to the stereo blend function to the rear seat passenger in the second row seat who is sleeping, so that the sleeping rear seat passenger may fall into a deep sleep without disturbing his or her sleep.

As described above, the present disclosure may assist the sleep of the rear seat passenger by adjusting the radio mode when the rear seat passenger listening to the radio broadcast falls asleep, so that the sleeping rear seat passenger may not be disturbed his or her sleep and fall into a deep sleep.

On the other hand, the above-described embodiments may be implemented in a form of a recording medium storing instructions executable by a computer. The instructions may be stored in a form of program code. When the instructions are executed by a processor, a program module is generated by the instructions so that the operations of the disclosed exemplary embodiments of the present disclosure may be conducted. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle, comprising:
an audio device including a radio tuner configured for receiving radio frequency signals;
a radar configured for detecting radar data of a rear seat passenger in the vehicle; and
a controller electrically connected to the radar and the audio device;
wherein the controller is configured to:
determine, in response that a radio broadcast is being played in the audio device, whether the rear seat passenger is sleeping based on the radar data detected by the radar;
switch, in response that the rear seat passenger is sleeping, a radio mode from a normal playback mode to a sleep assistance mode; and
change, in the sleep assistance mode, radio sound quality through the radio tuner or change, in the sleep assistance mode, radio frequency and the radio sound quality through the radio tuner,
wherein the vehicle includes a radio sound quality mode including a noise minimization mode, to change the radio sound quality,
wherein the controller is configured to change, in the sleep assistance mode, the radio sound quality mode to the noise minimization mode, and
wherein the noise minimization mode includes multiple modes of which tuning parameters of the radio tuner are set differently to minimize noise.

2. The vehicle of claim 1,
wherein the radar data includes biometric change characteristics including at least one of heart rate, respiration rate, and movement of the rear seat passenger, and
wherein the controller is further configured to:
generate a biometric change indicator indicating the biometric change characteristics of the radar data,
compare the biometric change indicator with a preset sleep pattern indicator, and
conclude that the rear seat passenger is sleeping in response to the comparison result matching a preset value or more than the preset value.

3. The vehicle of claim 1, wherein the radar is one of an impulse-radio ultra wideband (IR-UWB) sensor, a frequency-modulated continuous-wave (FMCW) radar, and a Doppler radar.

4. The vehicle of claim 1, wherein the controller is further configured to control, in the sleep assistance mode, at least one of a frequency and a tuning parameter of the radio tuner.

5. The vehicle of claim 1, wherein in the sleep assistance mode, the controller is further configured to obtain a radio frequency of the radio broadcast being played, and in response that the obtained radio frequency does not match a pre-stored radio frequency, change a current radio frequency to the pre-stored radio frequency.

6. The vehicle of claim 1, wherein in the sleep assistance mode, the controller is further configured to obtain a radio frequency of the radio broadcast being played, determine whether the radio frequency needs to be changed based on the obtained radio frequency, and upon concluding that the radio frequency needs to be changed, change a current radio frequency to a radio frequency of a radio broadcast conducive to sleep.

7. The vehicle of claim 6, wherein the radio frequency of the radio broadcast conducive to sleep is one of a radio frequency searched according to preset conditions from a schedule for the radio broadcast, a radio frequency stored by a user, or a radio frequency recommended according to big data analysis.

8. The vehicle of claim 1,
wherein the radio sound quality mode includes an original sound emphasis mode and an original sound/noise balance mode.

9. The vehicle of claim 1, wherein in the sleep assistance mode, the controller is further configured to obtain a currently set radio sound quality mode, and in response that the obtained radio sound quality mode does not match the noise minimization mode, change the currently set radio sound quality mode to the noise minimization mode.

10. The vehicle of claim 1, wherein in the sleep assistance mode, the controller is further configured to obtain a currently set radio sound quality mode and an electric field strength of the radio tuner, and change the currently set radio sound quality mode to the noise minimization mode based on the obtained radio sound quality mode and the electric field strength of the radio tuner.

11. The vehicle of claim 8, wherein the noise minimization mode includes a soft-mute mode, a high-cut mode, and a stereo blend mode of which the tuning parameters of the radio tuner are set differently to minimize noise.

12. The vehicle of claim 11, wherein in the sleep assistance mode, the controller is further configured to change the noise minimization mode to one of the soft-mute mode, the high-cut mode, and the stereo blend mode based on an electric field strength of the radio tuner.

13. The vehicle of claim 11, wherein the tuning parameters include at least one of electric field strength, ultrasonic noise, and gain of the radio tuner.

14. The vehicle of claim 11, wherein in the sleep assistance mode, the controller is further configured to apply the original sound emphasis mode to a first row seat speaker and one of the soft-mute mode, the high-cut mode, and the stereo blend mode to a rear row seat speaker in which the rear seat passengers are sleeping.

15. The vehicle of claim 14,
wherein the radio tuner includes at least one first radio tuner provided to correspond to the first row seat speaker and at least one second radio tuner provided to correspond to the rear row seat speaker, and
wherein in the sleep assistance mode, the controller is further configured to change a tuning parameter of the first radio tuner to a value corresponding to the original sound emphasis mode and a tuning parameter of the second radio tuner to a value corresponding to one of the soft-mute mode, the high-cut mode, and the stereo blend mode.

16. A method of controlling a vehicle including a radio turner for receiving radio frequency signals, the method comprising:

detecting, by a controller, in response that a radio broadcast is being played, radar data of a rear seat passenger in the vehicle through a radar, determining, by the controller, based on the detected radar data, whether the rear seat passenger is sleeping;

switching, by the controller, in response that the rear seat passenger is sleeping, a radio mode from a normal playback mode to a sleep assistance mode; and changing, by the controller, radio sound quality through the radio tuner in the sleep assistance mode or changing, by the controller, radio frequency and the radio sound quality through the radio tuner in the sleep assistance mode, wherein the vehicle includes a radio sound quality mode including a noise minimization mode, to change the radio sound quality, wherein the changing of the radio quality includes changing the radio sound quality mode to the noise minimization mode, and wherein the noise minimization mode includes multiple modes of which tuning parameters of the radio tuner are set differently to minimize noise.

17. The method of claim 16, wherein the radar data includes biometric change characteristics including at least one of heart rate, respiration rate, and movement of the rear seat passenger, and wherein the determining whether the rear seat passenger is sleeping includes:
  generating a biometric change indicator indicating the biometric change characteristics of the detected radar data,
  comparing the biometric change indicator with a preset sleep pattern indicator, and
  concluding that the rear seat passenger is sleeping in response to the comparison result matching a preset value or more than the preset value.

18. The method of claim 16, wherein the changing of the radio frequency and the radio sound quality further includes:
  in the sleep assistance mode,
  obtaining a radio frequency of the radio broadcast being played, and
  changing, in response that the obtained radio frequency does not match a pre-stored radio frequency, a current radio frequency to the pre-stored radio frequency.

19. The method of claim 16, wherein the radio sound quality mode includes an original sound emphasis mode and an original sound/noise balance mode.

20. The method of claim 16, wherein the noise minimization mode includes a soft-mute mode, a high-cut mode, and a stereo blend mode of which the tuning parameters of the radio tuner are set differently to minimize noise, and wherein the changing of the radio sound quality further includes changing the noise minimization mode to one of the soft-mute mode, the high-cut mode, and the stereo blend mode based on an electric field strength of the radio tuner or wherein the changing of the radio frequency and the radio sound quality further includes changing the noise minimization mode to one of the soft-mute mode, the high-cut mode, and the stereo blend mode based on an electric field strength of the radio tuner.

* * * * *